US009015794B2

(12) United States Patent
Ponchel et al.

(10) Patent No.: US 9,015,794 B2
(45) Date of Patent: Apr. 21, 2015

(54) DETERMINING SEVERAL SECURITY INDICATORS OF DIFFERENT TYPES FOR EACH GATHERING ITEM IN A COMPUTER SYSTEM

(75) Inventors: Christophe Ponchel, Trappes (FR); Jean-Francois Boeuf, Saint-Cloud (FR)

(73) Assignee: Airbus DS SAS, Elancourt (FR)

(*) Notice: Subject to any disclaimer, the term of this patent is extended or adjusted under 35 U.S.C. 154(b) by 167 days.

(21) Appl. No.: 13/808,936

(22) PCT Filed: Jul. 8, 2011

(86) PCT No.: PCT/EP2011/061697
§ 371 (c)(1),
(2), (4) Date: Jan. 8, 2013

(87) PCT Pub. No.: WO2012/007402
PCT Pub. Date: Jan. 19, 2012

(65) Prior Publication Data
US 2013/0117812 A1 May 9, 2013

(30) Foreign Application Priority Data

Jul. 13, 2010 (FR) .................................... 10 55715

(51) Int. Cl.
*G06F 21/50* (2013.01)
*G06F 21/55* (2013.01)
*H04L 29/06* (2006.01)

(52) U.S. Cl.
CPC ............. *G06F 21/50* (2013.01); *G06F 21/552* (2013.01); *H04L 63/1416* (2013.01)

(58) Field of Classification Search
CPC ..................................................... G06F 21/50
USPC ................................................ 726/1, 22, 25
See application file for complete search history.

(56) References Cited

U.S. PATENT DOCUMENTS 6,839,850 B1    1/2005   Campbell
7,607,169 B1   10/2009   Njemanze
(Continued)

FOREIGN PATENT DOCUMENTS

WO    02/054325 A2    7/2002
WO    2007/050225 A1  5/2007

OTHER PUBLICATIONS

International Search Report and Written Opinion mailed Oct. 31, 2011, in connection with International Application No. PCT/EP2011/061697, filed Jul. 8, 2011.
(Continued)

*Primary Examiner* — Haresh N Patel
(74) *Attorney, Agent, or Firm* — Duane Morris LLP; J. Rodman Steele, Jr.; Gregory M. Lefkowitz (57) ABSTRACT

For supervising the security of a computer system (SY) comprising several elementary computer items (BI), such as machines and applications, and several gathering items (BIg), such as networks, services or sites, gathering elementary items, a supervision device (DS) collects base measurements (MB) representative of states of the elementary items. A unit (UDI) determines several security indicators (I) of different types for each elementary item according to respective functions of the base measurements and several security indicators of different types for each gathering item. Each security indicator of a given type of a gathering item is determined according to a respective function of the security indicators of the given type of the elementary items gathered in the gathering item. The indicators of one item relate to the availability, the intrusion, the vulnerability and the compliance to a security policy.

14 Claims, 5 Drawing Sheets

(56) References Cited

U.S. PATENT DOCUMENTS

| | | |
|---|---|---|
| 8,627,414 B1 * | 1/2014 | McCune et al. .................. 726/4 |
| 2005/0273851 A1 | 12/2005 | Datla |
| 2006/0150248 A1 | 7/2006 | Ross |
| 2007/0143851 A1 | 6/2007 | Nicodemus |
| 2008/0021922 A1 | 1/2008 | Hailpern |
| 2008/0109396 A1 * | 5/2008 | Kacin .............................. 707/1 |
| 2009/0265776 A1 * | 10/2009 | Baentsch et al. .................. 726/9 |
| 2011/0030045 A1 * | 2/2011 | Beauregard et al. .............. 726/9 |
| 2011/0125548 A1 * | 5/2011 | Aharon et al. ............... 705/7.28 |
| 2011/0225009 A1 * | 9/2011 | Kress et al. ....................... 705/3 |
| 2011/0239269 A1 * | 9/2011 | Wahl et al. ........................ 726/1 |

OTHER PUBLICATIONS

Andreozzi S et al: "GridICE: a monitoring service for Grid systems", Future Generations Computer Systems, Elsevier Science Publishers, Amsterdam, NL, vol. 21, No. 4, Apr. 1, 2005, pp. 559-571, XP02290540.

* cited by examiner

DETERMINING SEVERAL SECURITY INDICATORS OF DIFFERENT TYPES FOR EACH GATHERING ITEM IN A COMPUTER SYSTEM

CROSS-REFERENCE TO RELATED APPLICATIONS

This application is a §371 national stage entry of International Application No. PCT/EP2011/061697, filed Jul. 8, 2011, which claims priority to French Patent Application No. 1055715 filed Jul. 13, 2010, the entire contents of which are incorporated herein by reference.

The present invention relates to the security field in computer systems.

A computer system comprises various computer items, also referred to as "entities", or "objects", or "components". Computer items are for example computer machines, such as various computers, stationary or mobile terminals, servers, routers, gateways, switches, etc., applications and operating systems installed in the machines, communication networks interconnecting the machines, such a network of servers and a network of user terminals, and services provided by the machines.

More particularly, this invention relates to a method and a device for supervising the security of a computer system for collecting and analyzing data relating to the states of computer items included in the computer system and depending on events and on behaviours of the items.

It is known to modify the Nagios supervision free or "open-source" software tool for supervising the security of machines gathered into networks.

The modified Nagios tool characterizes the security of a computer machine via four "low-level" indicators being related to the criticality, vulnerability, detection of incident and service. The criticality represents the importance of the machine. It has five values: minimum, low, mean, high and maximum. The vulnerability is represented by the counts of vulnerability counters categorized by their severities that could be info, low, mean and high. The incident indicator associates all the incidents relating to the machine, whatever the nature thereof, and depends on counts of incident counters categorized by the severities thereof that could be info, low, mean and high. A supervision point in a machine is a service provided by the machine, such as monitoring the opening of a port. The supervision point is checked by a control of the Nagios tool performed by means of a Nagios agent installed on the machine. The service indicator is represented by an availability rate, expressed in percentage, of the applicative services present on the machine. The levels of service are "available", "pending" (being checked), "dangerous", "critical" and "unknown" (unavailable).

For each machine, a security indicator is determined as a function of the first three previous "low-level" indicators and is equal to the sum of vulnerability and incident indicators being weighted by the levels of severity, parameterizable in configuration, and multiplied by the criticality of the machine.

An overall indicator is determined for each machine as a function of the security indicator and the service indicator and is made up by the maximum of those two indicators.

The meaning of the vulnerability, incident and service indicators is rigidly set in the code, leading to modify the application if the mode of calculation of a low level indicator is to be changed.

The machines are recorded in Nagios configuration files. Any new machine recorded in configuration is only taken into account when the Nagios tool is restarted, then initiating the checks by the services in the machine.

The machines could be gathered by network. The networks are recorded in Nagios configuration files and any new network recorded in configuration is only taken into account upon the restart of the Nagios tool. A network has a criticality deduced from the criticalities of the computer items, such as networks and/or machines, contained in the network, and is equal to the average of the criticalities of the contained items. An overall indicator is determined for each network as a function of the overall indicators of items contained in the network and is equal to the weighted average of the overall indicators of the contained items, such as networks and/or machines.

State data are recovered by the Nagios tool and the extensions thereof installed in a server either in the Nagios native modes for the service indicator, or by alarm packets or "traps" according to the SNMP ("Simple Network Management Protocol") supervision protocol for the incident indicator and the vulnerability indicator. The data from these indicators are not standardized, which does not facilitate the reading thereof. Moreover, parameterizing could only be modified through manually updating the configuration files of the Nagios tool and the extensions thereof, the server having to be restarted for taking into account these modifications. The aggregation functions of the indicators are fixed and determined in the applicative code. The incident-indicator aggregates the counts of incidents whatever the nature of the incidents relating to a machine, such as an intrusion for example.

Furthermore, the Nagios supervision tool shows to the administrator of the security of the supervised computer system only the exact, reflection of the technical arrangement of the supervised computer items included in the system. This representation could be hardly processable by the administrator when the supervised computer system is complex and the technical data allowing it to be described do not give any representation of the security state in the system being easy to understand.

The objective of the invention is to provide a supervision of the security in a computer system concealing the technical complexity of the system while showing the security state of the system through the security states of functional groups of elementary computer items, such as machines and applications included in the system, these functional groups corresponding to the job of the system user and being familiar to him.

In order to achieve this objective, a method for supervising the security of a computer system, comprising several elementary computer items, each elementary item being supervised depending on base measurements representative of predetermined states of the elementary item and several gathering items respectively gathering supervised elementary items, is characterized in that it comprises determining several security indicators of different types for each supervised elementary item, each security indicator being determined according to a respective function of base measurements associated with the security indicator, and determining several security indicators of different types for each gathering item, each security indicator of a given type of a gathering item being determined according to a respective function of the security indicators of the given type of the elementary items gathered in the gathering item.

A few security indicators being all determined according to a common process are sufficient for indicating, in a rapidly understandable way, the security state of an elementary item and a gathering item.

The supervision method of the invention is thereby able to supervise various types of gathering item belonging to the organizational, logical and geographical distribution of the elementary items in the supervised computer system, such as computer machines and applications. In particular, a gathering item could be a network of computer machines as elementary items gathered in the gathering item, or a service based on applications, as elementary items gathered in the gathering item, for example, implemented on several servers, or a geographical site gathering computer machines and/or networks as elementary items gathered, in the gathering item. These gathering items correspond to the arts of the user of the computer system and the security indicators thereof could be simultaneously displayed for easily tracking a relatively deficient gathering item.

In order to know the security state of the different elementary items in the supervised computer system and accordingly to understand the impact, on the gathering items of a security problem in any elementary item of the system, one of the security indicators of each elementary item could be dependent on base measurements relating to the availability of the item, or dependent on base measurements relating to at least one type of incident, in the item and on a severity factor of the type of incident, or dependent on base measurements relating to the vulnerability of the item and representative of an estimation of the impact of at least one security failure of a predetermined type on the item and a severity factor of the failure, or dependent on base measurements relating to a compliance assurance of the item with respect to a pre-established security policy. These four types of indicators could be established and displayed for each elementary item and for each gathering item.

According to another characteristic of the method intended for determining the security indicators of an elementary item such as a machine, an application or parts thereof, according to parameterizable functions aggregating by category the base measurements associated with the item and standardizing the updating process of the indicators whatever the type thereof, the determining of a security indicator of a given type of the elementary item comprises, further to a modification of one of the base measurements associated with the security indicator.

estimating a measurement derived according to a function of the modified base measurement and of at least one other base measurement interdependent with the modified base measurement, and estimating a metric according to a function of the estimated derived measurement, and of at least one second derived measurement according to a function of interdependent base measurements associated with the security indicator of a given type and different from the previous base measurements, the security indicator of a given type being determined according to a function dependant on the estimated metric.

If the supervised elementary item includes one or more other elementary items, determining the security indicator of the given type of the elementary item could comprise an aggregation of security indicators of the given type of parent elementary items included in the elementary item in an aggregation indicator, the security indicator of the elementary item being determined according to a function depending on the estimated metric and on the aggregation indicator.

The invention also relates to a device for supervising the security of a computer system comprising several elementary computer items. The device is able to collect base measurements associated with each elementary item and representative of predetermined states of the elementary item. Several gathering items gather respectively elementary items. The device is characterized in that it comprises a means for determining several security indicators of different types for each supervised, elementary item, each security indicator being determined according to a respective function of base measurements associated with the security indicator, and a means for determining several security indicators of different types for each gathering item, each security indicator of a given type of a gathering item being determined according to a respective function of the security indicators of the given type of the elementary items gathered in the gathering item.

A gathering item could be at least one of the following gathering items: a network of computer machines, as gathered elementary items, a service based on applications as gathered elementary items and a geographical site gathering computer machines and/or networks as gathered elementary items. The device could thus present the security state of the computer system to be supervised according to three familiar orientations.

Means for determining the item security indicator could be adapted for determining at least one of the following security indicators for an elementary item and a gathering item: a security indicator depending on base measurements relating to the availability of the item, a security indicator dependent on base measurements relating to at least one type of incident in the item and a severity factor of the type of incident, a security indicator dependent on base measurements relating to the vulnerability of the item and representative of an estimation of the impact of at least one security failure of a predetermined type on the item and a severity factor of the failure, and a security indicator dependent on base measurements relating to a compliance assurance of the item with respect to a pre-established security policy. The device according to the invention thus manages various types of indicator and the reactions being applied or to be applied as a result of the modification of any indicator. Notifying the modification of an indicator-leads the device administrator to know the detail of a problem of security of the computer system for intervening on the item notified by the modified indicator so as to solve the corresponding problem of security.

The invention also relates to a computer program able to be implemented in a supervision device of the invention, said program comprising instructions which, when the program is carried out in the supervision device, perform the steps of the method of the invention.

Additional characteristics and advantages of the present invention shall become easily apparent from reading the description that, follows of several embodiments of the invention given as non limitative examples, with reference to the corresponding accompanying drawings, in which.

Figure 1:
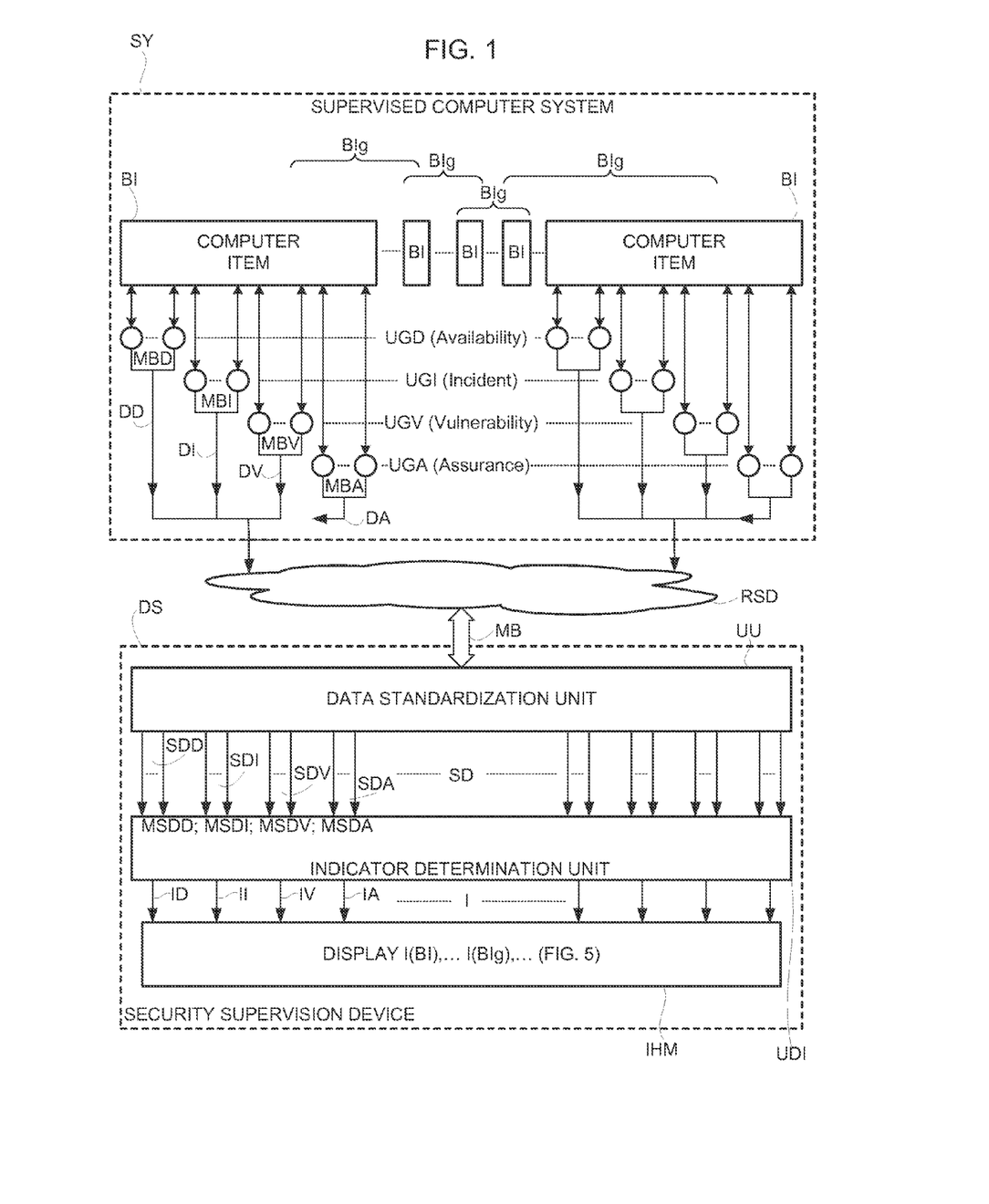
FIG. 1 is a schematic block diagram of a supervision device according to the invention for supervising computer items of a computer system.

With reference to FIG. 1, a security supervision device DS according to the invention is adapted for supervising the security of a computer system SY comprising numerous elementary computer items BI and being thus generally complex. It supervises the security state of elementary computer items so as to present the security states of gathering items BIg gathering elementary computer items in order to provide a reaction plan for inhibiting anomalies detected in the elementary computer items.

For example, the computer system belonging to a company or a company and the subsidiaries thereof, is organized in networks arranged in geographical sites and business services provided to the user-personnel of the company.

The elementary computer items BI to be supervised in the computer system SY have various technical sorts. For example, the elementary items BI are computer machines, such as computers, peripherals, fixed or mobile terminals, servers, routers, gateways, interfaces, switches, etc., some of which could be child items including parent items such as included hardware and software components. The elementary items BI could further be applications and operating systems arranged in the computer machines, some of which could be child items including parent items such as software modules and computer programs. Thus, more generally, an elementary item BI to be supervised could not comprise any other elementary parent item to be supervised, or comprise a set of parent elementary items to be supervised, some of which could be themselves composite elementary items. For example, a set of parent elementary items to be supervised could be a machine as a child item comprising several applications and/or hardware or software devices, such as controllers, to be supervised.

The gathering items BIg are local or extended communication networks interconnecting machines, such as a network of servers and a network of user terminals, services each having parts to be supervised implemented on at least two machines, as applications implemented on several servers, and geographical sites, each gathering machines and/or one or more networks and/or one or more services to be supervised.

The supervision device DS could be a computer with a man-machine interface IHM including a supervision console. The supervision device DS is in communication with managing units UG and comprises a data standardizing unit UU, an indicator determining unit UDI connected to the unit UU and the man-machine interface IHM connected to the unit UDI. The interface IHM is used notably for activating either automatically or manually the device DS, for capturing various data such as identifiers and characteristics of the items BI and BIg, for parameterizing functions for determining security indicators of the items and functions in the managing units UG being associated therewith, for capturing the architecture of the system SY, for displaying, amongst others the indicators of the items and the security state of the system and for notifying alarms.

Figure 2:
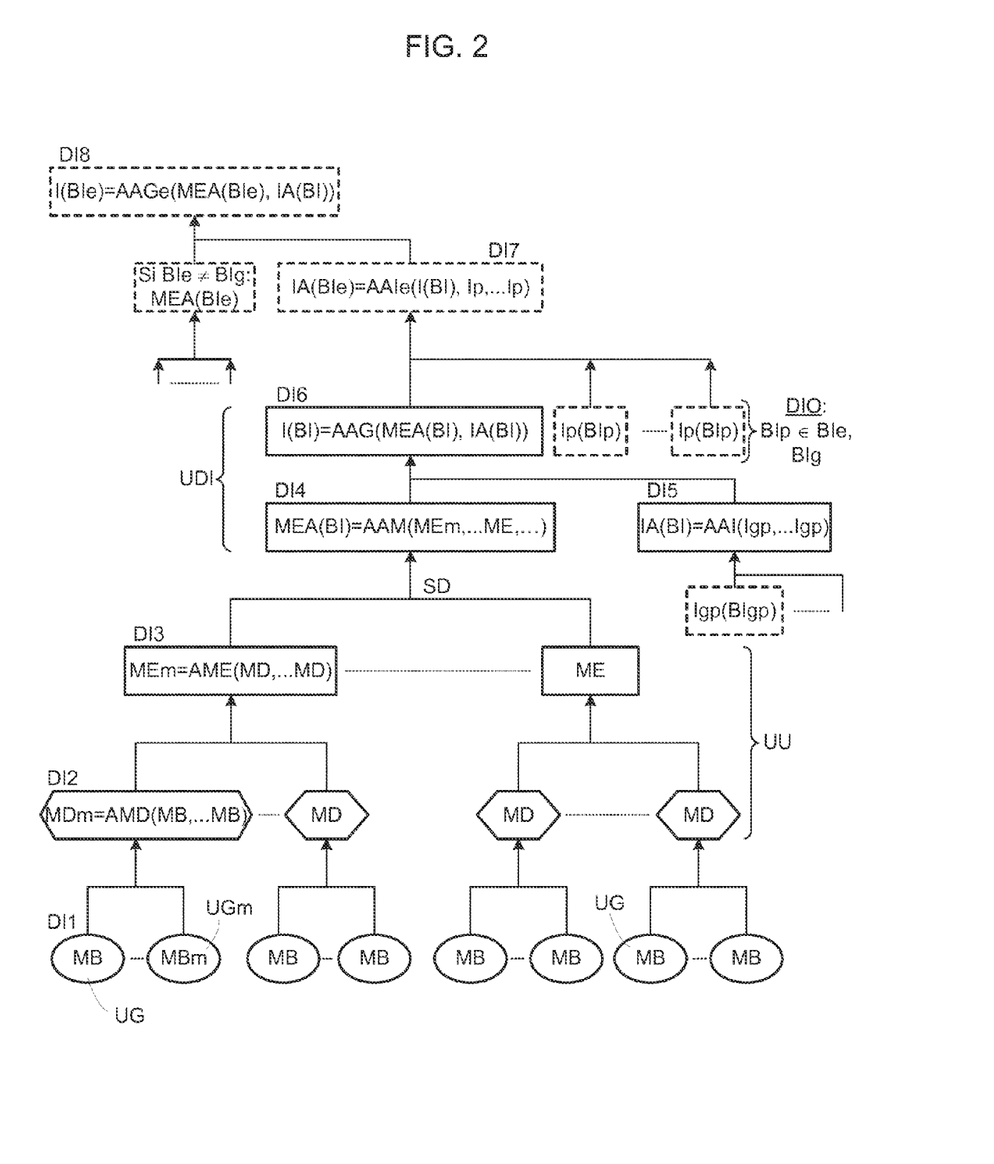
FIG. 2 is an algorithm of the supervision method according to the invention for determining, more particularly, a security indicator of an elementary item and a security indicator of a gathering item.
Figure 4:
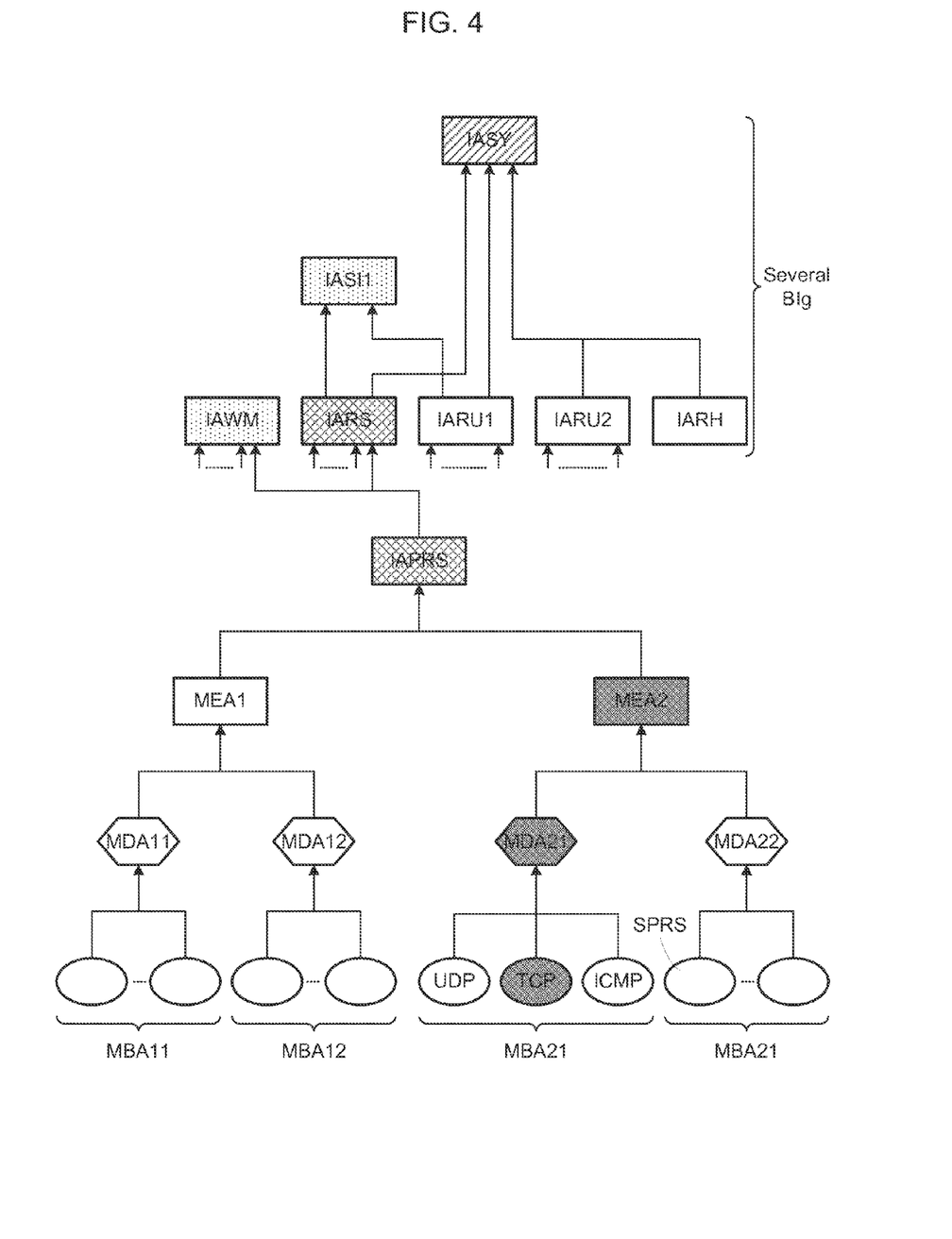
FIG. 4 is a diagram of the impact of an anomaly of compliance assurance in a firewall of the computer system of FIG. 3 on gathering items.

The managing units UG analyze the security states of the items of the system SY. Each elementary computer item BI to be supervised is an item being often associated with numerous respective managing units UG. However, a gathering item BIg comprising several elementary items to be supervised, such as a network, a service or a site, is not associated directly with managing units, and is only indirectly associated with the managing units of the elementary items that it comprises only through these elementary items, according to a tree-shaped hierarchy of the items of the system, as illustrated in FIGS. 2 and 4, to be described later on. The association of an elementary item BI with a respective managing unit. UG could be a link being either internal and/or external to the elementary item, when the managing unit is located in the elementary item or in the vicinity thereof. For example, a managing unit is a sensor, a probe, a robot or a software agent integrated or added to the item BI, and able to detect security states, such as predetermined events or behaviours occurring in the elementary item BI, and to control them as a function of pre-programmed rules, so as to notify operating anomalies of the item. For example, an anomaly could be an unauthorized access to an application in a machine or related to a service, an error in the analysis of the running of a communication protocol, an entering or outgoing predetermined message or packet probed in the traffic on a port of a machine or a component internal to this machine or on a link to or in a machine, a network or a site. The association of an elementary item BI to a respective managing unit UG could also be a conceptual relationship when the managing unit relies on statistical data delivered by a knowledge base relating to predetermined events or behaviours of an item similar to said elementary item. BI, notified by a third party. The code of each managing unit could be modified so as to parameterize the estimation of the associated base measurement.

As schematically shown on FIG. 1, an elementary computer item BI could be associated, with one or more availability managing units UGD, and/or to one or more incident managing units UGI and/or to one or more vulnerability managing units UGV and/or to one or more compliance assurance units UGA. Each managing unit UGD, UGI, UGV, UGA transmits, either periodically or depending on the occurrence of at least one event, or behaviour being specific to it, respective data DD, DI, DV, DA to the data standardizing unit UU. These data are amongst others an address, an identifier of the associated item and a base measurement MB adapted for the determination of a respective indicator ID, II, IV, IA of the elementary item BI the managing unit is associated to. The data standardizing unit UU collects through secured networks all the data DD, DI, DV, DA notified by the managing units UG and formats them into uniform structures of data SDD, SDI, SDV, SDA, wherein all data necessary to the determination in the unit UDI of the security indicators ID, II, IV, IA of the elementary computer item BI occur, independently from the technical nature of the item. Each indicator depends on one or more uniform structures of data.

Each of the structures of data SDD, SDI, SDV and SDA for the determination of respective indicators ID, II, IV and IA of an elementary item BI includes a metric ME. A metric ME is a combination of derived measurements MD relating to a common theme, such as organizing a remote management of the item, or monitoring network protocols or transport protocols, or predetermined steps of sessions in the elementary item. A derived measurement MD is a combination of interdependent base measurements MB transmitted by managing units to the standardization unit UU. A base measurement MB represents a control measured at a particular point of the elementary item BI by a managing unit UG. The interdependence of two base measurements MB regarding the elementary item means that the base measurements have common characteristics. For example, within the framework of connections of a machine relying on transport protocols being remotely secured, interdependent, base measurements check that the transport protocols are acceptable by a security policy, or have addresses of entering packets being compatible with security rules.

A base measurement MBD relating to the availability is an availability rate expressed in percentage of a component of the associated elementary item. The values of the availability rate are for example 100%, 75%, 50%, 25% and 0%, respectively, when the availability of the associated component is fully available, pending, dangerous, critical or unknown. For example, base measurements MBD of a terminal are measurements of availability rates of several automated office applications and of several peripherals of the printer and scanner types directly connected to the terminal. Two derived measurements MDD relating to this example of availability are the average of availability rates of the applications and the average of the availability rates of the peripherals measured on the ports of the terminal connected to the peripherals. The metric MED for this example of availability is a linear relationship of two averages of the availability rates provided, with different factors and represents an availability of the terminal in the field of office automation. According to another example, base measurements relating to the availability of a service server could be based on the counts of visitor user counters for predetermined service applications during a given period of time and/or on the number of open ports and the number of closed ports of predetermined protocols.

The base measurement MBA relating to the compliance assurance is an assurance rate expressing in percentage that a step or an operation process of the associated, elementary item, is assured to rather comply with one or more rules of a pre-established security policy. The values of the assurance rate are, for example 100%, 75%, 50%, 25% and 0%, respectively, when the step or the operation process fully complies, is a little altered, pretty altered, strongly altered and does not comply. For example, base measurements MBA for the compliance assurance of a remote access to an authentication server are relating to a control of the installation for an access prohibition to predetermined users in the server and a control of a mutual authentication between the server and a user terminal for opening a secured session. The derived measurement MDA relating to this example of the compliance assurance is the minimum value of the assurance rates associated with the two previous controls, expressing the access to the authentication server to be remotely secure. The metric MEA for this example of compliance assurance is the minimum value of the previous derived measurement. MDA and of another derived measurement expressing base measurements relating to the control of requests from a particular transport protocol in a server connection interface and represents a compliance assurance of an access to the authentication server according to the particular transport protocol.

A structure of data SDI for determining an intrusion indicator II could be recorded in the IODEF format ("Incident Object Description Exchange Format") of the RFC 5070 recommendation and be defined, amongst others, by a class of the elementary item BI involved in the incident relating to the intrusion, an instance indicating the type of the item infected by the incident, the beginning and ending instants of the incident, the type of incident and the description of the history of the incident, contributing to the traceability of the incident, and the description of an action for remedying the incident. In particular, the structure of data SDI comprises a metric MEI depending on counts of counters for incidents of intrusion, as base measurements, associated with severity factors and a type of incident. A counter of incidents of intrusion is incremented by one unit as soon as the managing unit, including the incident counter detects a respective incident of intrusion in the elementary item BI corresponding to the severity factor and to the type of incident associated with the incident, counter and is decremented when such an incident is overcome. The severity factor associated with an incident counter is all the higher as the incident is serious. Incident counters included in managing units UGI associated with the item BI could be categorized by type of incident. For example, the elementary item BI is associated with three incident, counters associated with a type of incident, and to severity factors representative of a minor incident, a mean incident and a major incident. The counts of the three incident counters, as base measurements MBI, are combined into a derived measurement MDI depending on the severity factors, and the derived measurements MDI relating to types of incident of a common category are combined into a metric of incident MEI representing the seriousness of the incidents of this category having occurred and not overcome in the elementary item BI. An incident in a machine or an application could be a more or less serious attack, such as for example, the intrusion of a command into a defective program by an attacker for installing a downloaded script, the injection of a malicious code in a part of an application for modifying the code thereof and performing particular commands, in response to a duplicate message or packet, a saturation of an IP address allocation server or of a link connected to the server through an overflow with a high number of requests, etc.

A structure of data SDV for determining a vulnerability indicator IV of an elementary item BI comprises a metric MEV being representative of the estimation of the impact of a security failure on the elementary item BI it is related to. A security failure is a potential threat and could allow an intruder to access more or less easily to the elementary item. It could be a bug resulting from programming errors of an application or occurring upon the installation of a new application in a machine allowing, for example, to access confidential data or the opening of a port, an erroneous interpretation of a script or a command, etc. The structure of data SDV includes a metric of vulnerability MEV estimating the impact, of security failures of a same category. Each failure of this category is defined by a confidence rate in the impact of the failure in the elementary item BI, a severity factor and a type of the failure. The structure of data SDV further comprises a short name and a detailed description of the security failure of this category, solutions for overcoming the failure, and references to vulnerability knowledge bases relative to the failure and maintained by third parties. A reference is characterized by a single identifier and the name of the knowledge base, as for example, the bases CVE ("Computer Vulnerabilities and Exposures") and Bugtraq. For example, a managing unit associated with the item BI includes a vulnerability counter associated with a severity factor and a type of the failure having its count, as a base measurement, being incremented by the confidence rate of a failure notified to the managing unit and having a severity factor and a type associated with the managing unit. Vulnerability counters included in managing units UGV associated with the elementary item BI could be categorized by severity factor and type of failure. For one type of failure, three severity factors could be contemplated: low, mean and high. A derived measurement MDV combines the counts of the three vulnerability counters, as base measurements MBV, as a function of severity factors. A vulnerability metric MEV representing the vulnerability of failures of one category combines the derived measurements MDV of a category of failures in the item BI as a function of the types of failures.

The data standardization unit UU transmits the uniform structures of data SDD, SDI, SDV and SDA to the indicator determining unit UDI.

Each elementary item BI in the unit UDI is characterized more specifically by the following information being memorized in the unit UI:
 a criticality CR indicating the importance of the elementary item compared to the need of the user of the system SY being preliminarily defined by the administrator of the supervision device DS and being a function of the implementation and of the role of the elementary item BI it plays in the business activity of the user. For example, the criticality of a server or a router is higher than that of a user terminal, and the criticality of an authentication application in a machine is higher than a service or an office automation application;

uniform structures of data SDD, SDI, SDV and SDA of the elementary item aiming at respectively determining the indicators of availability ID, intrusion II, vulnerability IV and compliance assurance IA of the elementary item; and the security indicators of availability ID, intrusion II, vulnerability IV and compliance assurance IA resulting in the overall level of security of the elementary item; and, if the item is a child item, such as a gathering item BIg, comprising several supervised elementary items, the security indicators of the parent items it contains.

A gathering item BIg is also supervised thanks to the determination of an availability indicator, an intrusion indicator, a vulnerability indicator and a compliance assurance indicator. Each one of these indicators depends on indicators of the same type of the elementary items as the gathering item contains and does not directly depend on any metric specific to the gathering item. The metrics are only associated with elementary items.

The determination method of a security indicator is illustrated on FIG. 2 and comprises the steps DI1 to DI6 for determining an indicator, referred to by I, of an elementary item BI, being one of the indicators ID, II IV and IA of the item BI such as a machine, or a hardware or a software part thereof or an application or a part thereof. The determination of the indicator I is automatically triggered for the item BI each time a base measurement MBm of the item the indicator I depends on is modified further to a predetermined event or behaviour detected in the elementary item by one UGm of the managing units associated with the elementary item, in step DI1. The indicator I of the item BI is also determined automatically each time a security indicator Igp of the same type as the indicator I and associated with a parent elementary item. BIP included, in the item BI, as a child item, is updated, as will further detailed later on. All the updated data resulting from the modification of a base measurement MBm are saved in the units UU and UDI so as to be used for subsequent updates of indicators, as a result of modifications of other base measurements. Preliminarily, before the supervision device DS is implemented, the administrator thereof has entered the tree-shaped hierarchy of the supervised items in the system SY so as to memorize it in the unit UDI. An example of a tree-shaped hierarchy is schematically shown on FIG. 5 to be described later. All the functions referred to hereinafter as "algorithms" for determining derived measurements, metrics and indicators can be parameterized by the administrator of the device DS via the interface IHM upon configuration phases.

Updating the base measurement MBm of the elementary item BI, referred to as interpretation, occurs if a command or an incident is received by the managing unit UGm associated with the item BI and managing the basis measurement MBm, thus modifying the value of the base measurement MBm, in step DI1. The managing unit UGm contains a specific interpretation algorithm for varying the base measurement. MBm. The data standardization unit. UU re-estimates in step DI2 the derived measurement MDm depending on the modified base measurement MBm and on the other base measurements MB associated with the item BI and interdependent with the base measurement MBm according to another specific interpretation algorithm AMD included in the unit UU. Then, the unit UU re-estimates and memorizes in step DI3 the metric MEm depending on the re-estimated derived measurement MDm and on the other derived measurements MD associated with the item BI according to a specific standardization algorithm AME included in the unit UU. The unit UU constitutes a structure of data SD notably with the re-estimated derived measurement MDm.

The indicator determining unit UDI then automatically determines the indicator I of the item BI depending on the re-estimated updated metric. MEm, while respectively performing aggregation algorithms implemented in the unit UDI, according to the three following steps DI4, DI5 and DI6. These algorithms each aggregate homogeneous variables and respect the formalism established by the unit UDI. For each one of the security indicators ID, II, IV and IA, three aggregation algorithms specific to the security indicator can have been preselected in a library of algorithms of the unit UDI by the administrator of the supervision device DS, respecting the formalism established by the unit UDI. These algorithms are interchangeable and parameterizable as a function of the needs of the user of the system, notably of the architecture of the computer system SY and the types of the supervised items it contains. Algorithms included by default in the library are, for example, the minimum, the maximum and the average weighted by the criticalities of the parent items contained in the elementary item BI, the indicator of which is to be determined. The administrator could add other algorithms for meeting specific issues.

In step DI4, the indicator determining unit UDI aggregates the re-estimated metric MEm in step DI3 and, should they exist, one or more other memorized metrics ME of the elementary item BI relating to the same type of indicator, while applying a metrics aggregation algorithm AAM on these metrics so as to produce an aggregation metric MEA (BI) of the item BI. For example, if the item BI has another metric ME and if the algorithm AAM relies on the minimum, the aggregation metric is:

$$MEA(BI)=AAM(MEm,ME)=\min(MEm,ME).$$

In step DI5, the unit UDI aggregates indicators Igp of the parent items BIgp included in the item BI, if the item BI includes at least one parent item BIgp, or more generally is a composite item. The unit. UDI applies to this end an indicator aggregation algorithm of parent item AAI on the indicators Igp to produce an aggregation indicator of the parent item IA(BI). For example, if the item BI, as a computer machine, includes three parent items BIgp1, BIgp2 and BIgp3 having indicators Ipg1, Ipg2 and Ipg3, as applications implemented in the machine, and if the algorithm AAI is based on the average weighted by the criticalities CRgp1, CRgp2 and CRgp3 of the parent items BIgp1, BIgp2 and BIgp3, the aggregation indicator of the parent item is:

$$IA(BI)=AAI(Igp1,Igp2,Igp3), \text{ that is}$$

$$IA(BI)=[CRgp1\times Igp1+CRgp2\times Igp2+CRgp3\times Igp3]/[CRgp1+CRgp2+CRgp3].$$

In step DI6, the unit UDI aggregates the results MEA(BI) and IA(BI) of the previous aggregations, should they exist, applying an overall aggregation algorithm AAG on these results for producing the updated indicator I of the item BI. For example, the algorithm AAG is based on the maximum, and the updated indicator is:

$$I(BI)=AAG(MEA(BI),IA(BI))=\max(MEA(BI),IA(BI)).$$

If the item BI as a parent item is included in one or more child items BIe according to the tree-shaped hierarchy of the supervised items of the system SY, as an application, or a machine, or a hardware or software module included as an elementary item in a gathering item BIg, such as a network, a service or a site, the security indicator of each child, item BIe automatically inherits the update of the indicator I of the elementary item BI. Preliminarily, for any child item BIe and in particular for any gathering item BIg, the method comprises an initial gathering step DI0 for configuring in the unit UDI the child item BIe with the identifiers of the elementary items BI it contains.

In order to update the security indicator of the child item BIe, the unit UDI then performs the step DI7 similar to the step DI5, and if the child item is not a gathering item BIg, the step DI8 similar to the step DI6. In step DI7, the unit UDI aggregates indicators Ip of the parent items BIp included in the item BIe, including the indicator I of the item BI, if the item BIe includes at least one parent item, or more generally is a composite item. The aggregation is performed applying an indicator aggregating algorithm AAIe specific to the child item BIe on the indicators Ip of the parent items BIp and their criticalities for producing an aggregation indicator of the parent item IA(BIe). In step DI8, if the child item BIe is not a gathering item and is an elementary item associated with at least one metric MEA(BIe), the unit UDI aggregates the aggregation metric MEA(BIe) of the child item BIe memorized in the unit UDI and the aggregation indicator of the parent item IA(BIe) resulting from the previous aggregation while applying an overall aggregation algorithm AAGe specific to the child item BIe on the variables MEA (BIe) and IA(BIe) for producing the updated indicator I(BIe) of the child item BIe.

Steps similar to steps DI7 and DI8 are performed by the unit UDI for updating the indicators of the same type as the indicator I of the item BI, associated with all the items, including the item BI, for all the "generations" of item to inherit the update of the indicator I in the hierarchy tree of the system SY. For example, the item BI is an application Ap included in a server Sr1 also included in one Res1 of the networks located in a geographical site Si1. The server Sr1 is involved in a service Sc1. The indicators of the same type as the updated indicator of the application Ap, associated with the server Sr1 are first updated. Then, the indicators of the same type associated with the network Res1, the service Sc1 and the site Si1 are respectively updated.

The man-machine interface IHM rapidly displays in an understandable way the propagation of the impact of the modification of any base measurement or any indicator through the supervised system SY. For example, the propagation of the probable impact of the unavailability of a server, or of an incident detected during the running of an application, or of an infection of a page or of a script being downloaded, in a machine, or a non-compliance of an update of an application, is immediately displayed at the screen of the interface IHM in the modelled system SY.

Thus, according to the invention, the indicator determining unit UDI considers different orientations of analysis relating to the gathering items BIg being:
- an orientation to one or more of the computer networks computer machines belong to, including, in turn, applications;
- an orientation to one or more services relating to the jobs of the users and needed for the activities of the company owning the supervised system SY; and
- an orientation to one or more sites representing the geographical distribution of the computer hardware and software items of the company.

These orientations are integral with a single model containing the set of items to be supervised in the system SY, the relationships they have with each other and the hierarchy divisions corresponding to the above described orientations. As soon as an indicator for an item is updated, the unit UDI automatically determines the indicators of all the impacted items according to these orientations.

Moreover, the indicator determining unit UDI considers the connected or unconnected state of the machines in the computer system SY, for example through monitoring the opening of ports, so as to check the supervision perimeter of each user authorized to use at least one of the machines and at least one of the services of the system SY. The supervision perimeter represents the set of items the user is authorized to supervise. The unit UDI thus evaluates the overall state of security in the supervision perimeter of the connected user and the interface IHM could display the impact of the modification of any base measurement or any indicator on the supervision perimeter in order to, more specifically, invite the user not to undertake or stop certain actions and commands that would be detrimental to his works.

More generally, as a function of the modifications of the security indicators ID, II, IV and IA processed by the unit UDI, the latter is able to define a reaction plane to be initiated by the administrator of the supervision device DS. For example, the unit UDI establishes a list associating for each item the four security indicators, the present failures, an incident and the associated reaction plane. The unit UDI transmits the list to the interface IHM that displays it clearly according to a particular organization, such as illustrated on FIG. 5.

In order to better understand the advantages of the invention, an example of the impact of an anomaly detected in a probe, through a computer system SY is detailed hereinafter. As shown on FIG. 3, the computer system is essentially implemented on two sites SI1 and SI2 of a company in two different cities. The computer system SY requires the positioning of an overall network divided into a network RS of servers SE and two networks of users RU1 and RU2 together on the two sites SI1 and SI2. Each network of users RU1, RU2 comprises a server SE1, SE2 and terminals TU1, TU2 connected by a switch CU1, CU2. The network of servers RS is installed in a computer centre of the first site SI1 comprising a router RO1 servicing the networks RS and RU1. The networks RS, RU1 and RU2 are supervised, in terms of security by a hypervision network RH through a dedicated secured network RSD of a telecommunication operator comprising inter alia routers RO. The hypervision network RH is installed in the first site SI1 and comprises, more specifically, a security supervision device DS according to the invention connected to a hypervision server SEH connected through a fire-wall PH to a router RO of the dedicated secured network RSD.

Figure 3:
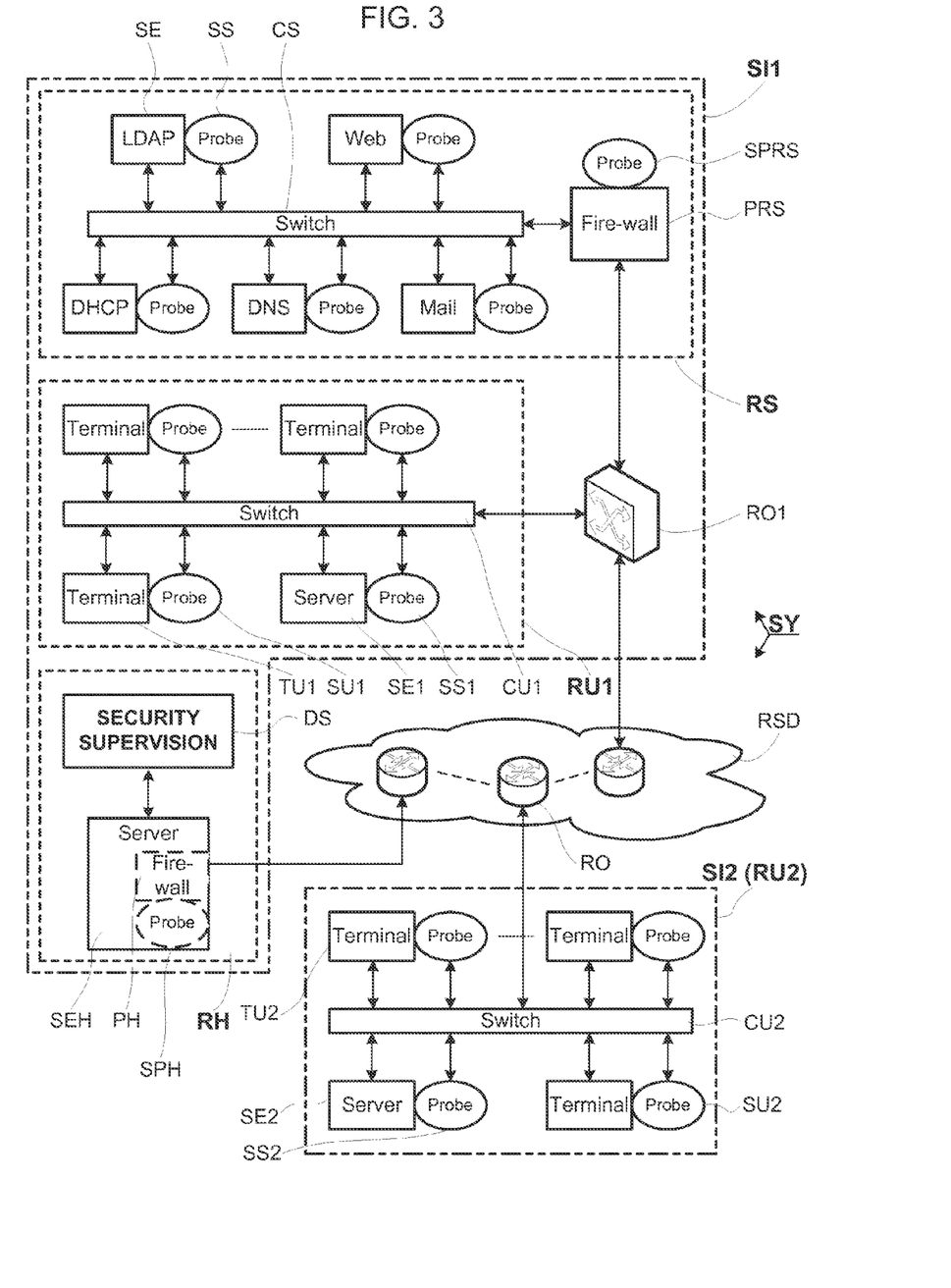
FIG. 3 is a schematic block-diagram of a computer system with several gathering items such as networks, services and sites.

The company makes available to its users-employees a service of access to a "Web Mail" electronic messaging via a Web page. In the network of servers RS, the Web Mail service is provided by a Web server and a server of electronic Mail and requires the presence of a DNS ("Domain Name System") domain name server and of a DHCP ("Dynamic Host configuration Protocol") address dynamic allocation server. The network of servers RS further comprises a server of access to directories of user information LDAP ("Lightweight Directory Access Protocol"), a switch CS connected to the servers and a fire-wall PRS in charge of the protection of the services provided by the servers of the network RS.

The security information coming from the network of servers RS of the networks of users RU1, RU2 and from the hypervision network RH are notified by probes, as managing units UG, arranged in these networks for the security supervision device DS. In order not to overload FIG. 3, some probes SS, SPRS, SU1, SS1, SU2, SS2 and SPH in these networks are schematically represented.

It is assumed that the anomaly detected in a probe SPRS is relating to a base measurement MBA relating to the compliance assurance of the fire-wall PRS in the network of servers RS. The following scenario shown on FIG. 4 shows how the impact of a compliance failure of the fire-wall PRS on the supervised networks, services and sites propagates and is notified to the device DS.

Initially, all the controls performed in the supervised system SY notify a total compliance with the pre-established security policy. The assurance rates MBA, as base measurements, relating to all the above-mentioned supervised computer items in the system SY are thus 100%.

More specifically in the fire-wall PRS protecting the Web Mail service, two metrics are monitored by probes SPRS: the remote management MEA1 and the filtering MEA2, as shown on FIG. 4. The metrics MEA1 and MEA2 require base measurements MBA11 and MBA21 for controlling parameterizing remote access protocols such as UDP ("User Datagram Protocol"), TCP ("Transmission Control Protocol") and ICMP ("Internet-Control Message Protocol") and the listening of connections by these protocols to the fire-wall PRS, and base measurements MBA12 and MBA22 for controlling the integrity of parameterizing files of filtering rules and their adequacy to the security policy. These base measurements are performed periodically.

The data standardization unit UU combines the base measurements MBA11 and MBA12 into derived measurements MDA11 and MDA12 and the base measurements MBA21 and MBA 22 into derived measurements MDA21 and MDA22, and the derived measurements MDA11 and MDA12 into the metric MEA1 and the derived measurements MDA21 and MDA22 into the metric MEA2. The indicator determination unit UDI combines the metrics MEA1 and MEA2 into an indicator of compliance assurance IAPRS for the elementary item made up by the fire-wall PRS. As all the controls result in a total compliance, the base measurements, the derived measurements, the metrics and the assurance indicator are in a "green" state corresponding to assurance rates at 100%.

Upon controls on the fire-wall PRS, a probe SPRS detects an anomaly on filtering rules for example while detecting that a non secured TCP protocol is declared as authorized while the security policy stipulates that it should not be.

Automatically, the compliance assurance indicator IAPRS of the fire-wall PRS is again determined as follows. The base measurement MBA21 relating to the filtering of the protocol TCP switches to a "red" non-compliance state. Assuming that the function of interpretation of the derived measurement MDA21 relating to the filtering of protocols stipulates that the value thereof is a function of the minimum value of the base measurements MBA21 it depends on, the derived measurement MDA21 switches to a "red." state. Assuming that the function of standardization of the metric MEA2 relating to the stipulated filtering is the minimum of the derived measurements MDA21 and MDA22 it depends on, the metric MEA2 also switches to a "red" state. Assuming that the function of aggregation for the assurance indicator IAPRS of the fire-wall PRS is the weighted average of the metrics MEA1 and MEA2 and that the weight of the filtering metric MEA2 is higher than that of the remote administration metric MEA1, the indicator IAPRS of the fire-wall PRS switches to a "dark orange" state (twice hatched) for resulting in a strongly non-compliant assurance, for example corresponding to an assurance rate ranging between 25% and 49%. The twice hatched members on FIG. 4 illustrate a first indication of the impact of the detected, anomaly on the directly relevant, item PRS.

The unit UDI in the supervision device DS also propagates the impact of the detected anomaly to all the Web Mail child computer items SI1, RS and SY depending on the relevant item PRS.

The fire-wall PRS protecting the Web Mail service, the compliance assurance thereof becomes altered. The impact depends on the aggregation algorithm relating to the assurance indicators of the items included in the Web Mail service. This aggregation algorithm is for example an average of the assurance indicators of the items weighted by the weight of the fire-wall PRS and the weights of the other supervised items defined in the service. Assuming that the indicator IAPRS of the fire-wall has a very low weight, the assurance indicator IAWM of the Web Mail service is hardly affected and switches to a "yellow" hardly altered state (dotted line) for example corresponding to an assurance rate ranging between 75% and 99%. This is interpreted as a low impact on the user terminals using the Web Mail service.

In the first site SI1, the fire-wall PRS plays an important part but amongst, other items. The assurance indicator IASI1 of the site SI1 is also hardly altered and switches to a "yellow" (dotted line) state. This is interpreted as a low physical impact.

Any item of the network of servers RS is considered as indispensable. The alteration of the assurance indicator of such an item, as the indicator IAPRS of the fire-wall PRS, is interpreted in the unit UDI as that of all the network RS depending on an aggregation algorithm based on the minimum of the assurance indicators of the supervised items included in the network RS. The network of servers RS has therefore a strongly altered assurance indicator IARS and switches to a "dark orange" (double hatched) state as the assurance indicator IAPRS. This is interpreted as a very strong impact, on the network RS.

In the supervised computer system SY, the network of servers RS is considered as more important than the networks of users RU1 and RU2 and the hypervision network RH. The aggregation algorithm for the compliance assurance of the system SY is for example an average of the assurance indicators IARS, IARU1, IARU2 and IARH of the networks RS, RU1, RU2 and RH weighted by the low weights of the networks RU1, RU2 and RH and the higher weight of the network RS. The system SY has therefore a mildly altered assurance indicator IASY and switches to the "orange" state (merely hatched), for example corresponding to an assurance rate ranging between 50% and 74%. This is interpreted as a strong impact on the system SY.

Figure 5:
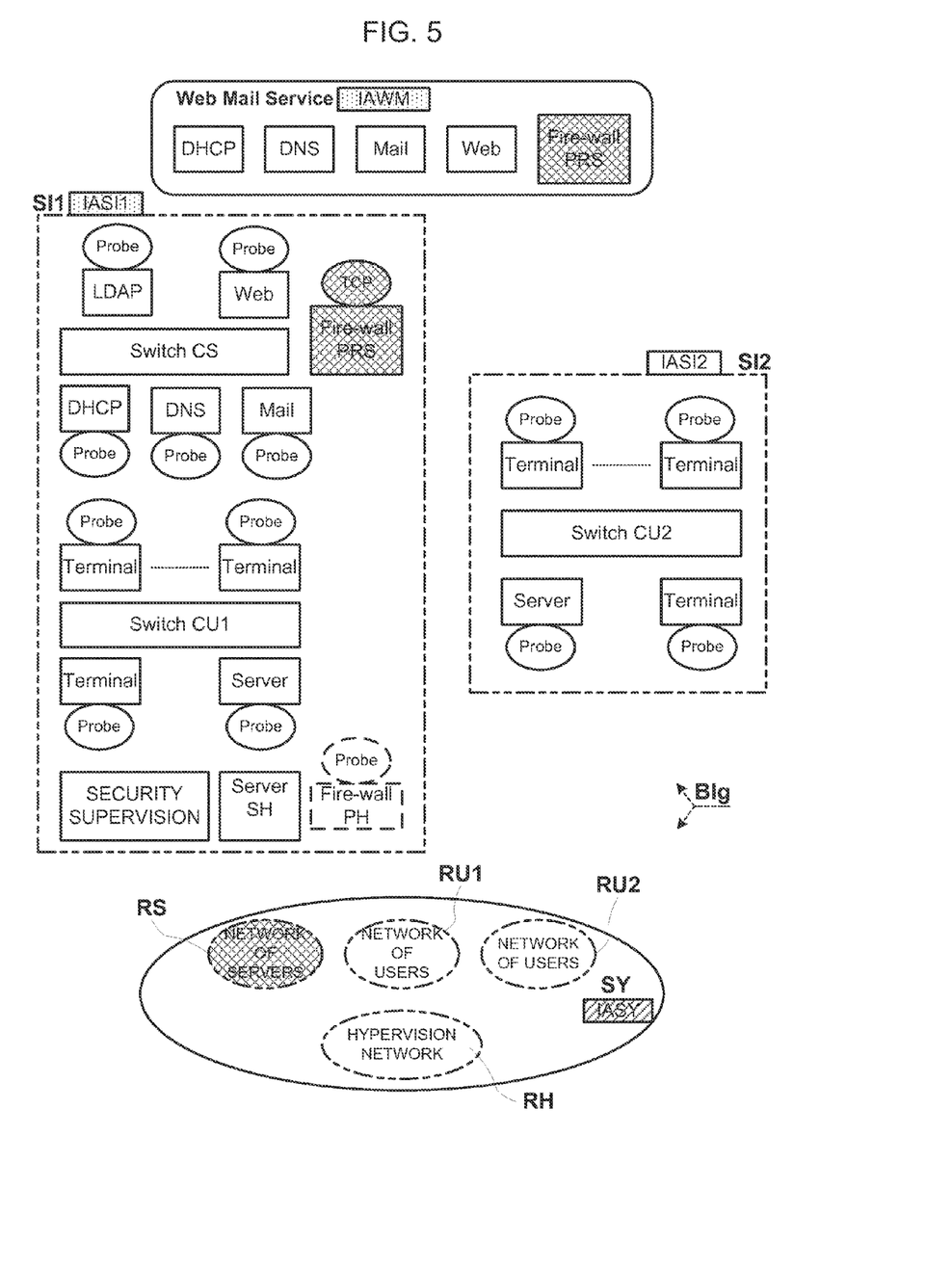
FIG. 5 schematically shows a screen page with the impact of the anomaly of compliance assurance propagated in the gathering items of the computer system.

As shown on FIG. 5, the supervision console in the man-machine interface IHM displays, amongst others, the states of security of the Web Mail service, the sites SI1 and SI2 and of the system SY relating to their compliance assurance indicators IAWM, IASI1, IASI2 and IASY with the compliance assurance indicators of the respective parent items they inherit from. It seems that the detection of an anomaly of non-compliance in the fire-wall PRS is simultaneously passed on according to the three orientations of the networks, the services and the geographical sites. The detection of the anomaly has led to a low impact for the users and to a problem to be overcome urgently by the computer service of the company for remedying a significant failure of the security of the network of servers RS.

The herein described invention relates to a method and a device for security supervision of a computer system SY comprising several elementary computer items BI. According to an implementation, the steps of the method of the invention are determined by the instructions of a computer program, incorporated into the base station. The program able to be implemented in the supervision device of this invention comprises program instructions which, when said program is carried out in the supervision device having its operation then controlled, through the program being carried out, perform the steps of the method according to the invention.

Consequently, this invention also applies to a computer program, notably a computer program recorded on or in a recording medium readable by a computer and any data processing device, adapted, for implementing this invention. This program could use any programming language, and be in the form of a source code, an object code or an intermediary code between a source code and an object code such as a partially compiled form or any other form desired for implementing the method according to the invention. The program could be downloaded in the base station via a communication network, such as internet.

The recording medium may be any entity or device being able to store the program. For example, the medium, may comprise a storage medium, on which the computer program according to the invention is recorded, such as a ROM, e.g. a CD ROM or a microelectronic circuit ROM, or a USB key, or a magnetic recording medium, e.g. a hard disk.

The invention claimed is:

1. A method for supervising the security of a computer system (SY) comprising several elementary computer items (BI), each elementary item being supervised in dependence on base measurements (MB) representative of predetermined states of the elementary item, and several gathering items (Ble, Big) respectively gathering elementary items, characterized in that the method comprises determining (DI6) several security indicators (I) of different types for each supervised elementary item (BI), each security indicator being determined according to a respective function (AMD, AME, AAM, AAG) of base measurements (MB) associated with the security indicator, wherein the determining (DI6) of a security indicator of a given type (I) of an elementary item (BI) further comprises as a result of a modification (DI1) of one (MBm) of the base measurements associated with the security indicator (I), estimating (DI2) a derived measurement (MD) according to a function (AMD) of the modified base measurement (MBm) and at least another base measurement (MB) interdependent with the modified base measurement, and estimating (DI3) a metric (ME) according to a function (AME) of the estimated derived measurement (MD) and at least a second derived measurement (MD) according to a function of interdependent base measurements (MB) associated with the security indicator of a given type (I) and different previous base measurements, the security indicator of a given type (I) being determined according to a function dependent on the estimated metric (ME); and determining (DI7) several security indicators (IA(BIe)) of different types for each gathering item, each security indicator of a given type of a gathering item being determined according to a respective function (AAIe) of the security indicators (I) of the given type of the elementary items (BIp) gathered in the gathering item (Ble, Big).

2. The method according to claim 1, wherein one of the gathering items is a network (RS; RU1; RU2) of computer machines as elementary items gathered in the gathering item.

3. The method according to claim 1, wherein one of the gathering items is a service (Web Mail) based on applications, as elementary items gathered in the gathering item.

4. The method according to claim 1, wherein one of the gathering items is a geographical site (SI1; SI2) gathering computer machines and/or networks as elementary items gathered in the gathering item.

5. The method according to claim 1, wherein one (ID) of the security indicators of each elementary item (BI) depends on base measurements relating to the availability of the item (BI).

6. The method according to claim 1, wherein one (II) of the security indicators of each elementary item (BI) depends on base measurements relating to at least one type of incident in the item (BI) and a severity factor of the type of incident.

7. The method according to claim 1, wherein one (IV) of the security indicators of each elementary item (BI) depends on base measurements relating to the vulnerability of the item (BI) and representative of an estimation of the impact of at least one security failure of a predetermined type on the item (BI) and a severity factor of the failure.

8. The method according to claim 1, wherein one (IA) of the determined security indicators of the supervised elementary item (BI) depends on base measurements relating to a compliance assurance of the item (BI) with respect to a pre-established security policy.

9. The method according to claim 1, wherein the determining (DI6) of the security indicator (I) of the given type of the elementary item (BI) comprises an aggregation (DI5) of security indicators (I) of the given type of parent elementary items (BIgp) included in the elementary item in an aggregation indicator (IA(BI)), the security indicator (I) of the elementary item being determined according to a function (AAG) depending on the estimated metric (ME) and on the aggregation indicator (IA(BI)).

10. The method according to claim 1, wherein the functions (AMD, AME, AAM, AAG; AAIe, AAGe) are parameterizable.

11. A device (DS) for supervising the security of a computer system (SY) comprising several elementary computer items (BI), the device being able to collect base measurements (MB) associated with each elementary item and representative of predetermined states of the elementary item, and several gathering items (Ble, Big) respectively gathering elementary items, characterized in that the device comprises a means (UU, UDI) for determining several security indicators (I) of different types for each supervised elementary item (BI), each security indicator being determined according to a respective function (AMD, AME, AAM, AAG) of base measurements (MB) associated with the security indicator, means for determining several security indicators of a given type (I) in an elementary item (BI) further comprises as a result of a modification (DI1) of one (MBm) of the base measurements associated with the security indicator (I), means for estimating a derived measurement (MD) according to a function (AMD) of the modified base measurement (MBm) and at least another base measurement (MB) interdependent with the modified base measurement, and means for estimating a metrics (ME) according to a function (AME) of the estimated derived measurement (MD) and at least a second derived measurement (MD) according to a function of interdependent base measurements (MB) associated with the security indicator of a given type (I) and the different previous base measurements, the security indicator of a given type being determined according to a function dependant on the estimated metrics; and a means (UDI) for determining several security indicators (IA(BIe)) of different types for each gathering item, each security indicator of a given type of a gathering item being determined according to a respective function (AAIe) of the security indicators (I) of the given type of the elementary items (BIp) gathered in the gathering item (Ble, Big).

12. The device according to claim 11, wherein a gathering item (Big) is at least one of the following gathering items: a network (RS; RU1; RU2) of computer machines as gathered elementary items, a service (Web Mail) based on applications as gathered elementary items and a geographic site (SI1; SI2) gathering computer machines and/or networks as gathered elementary items.

13. The device according to claim 11, wherein the means for determining the security indicator of the item (UU, UDI; UDI) are adapted for determining at least one of the following security indicators for an elementary item (BI) and a gathering item (Big): a security indicator depending on base measurements relating to the availability of the item (BI; Big), a security indicator (II) depending on base measurements relating to at least one type of incident in the item (BI; Big) and a severity factor of the type of incident, a security indicator (IV) depending on base measurements relating to the vulnerability of the item (BI; Big) and representative of an estimation of the impact of at least one security failure of a predetermined type on the item (BI; Big) and of a severity factor of the failure, and a security indicator (IA) depending on base measurements relating to a compliance assurance of the item (BI) with respect to a pre-established security policy.

14. A computer program comprising a plurality of non-transitory instructions that, when executed on a supervision device (DS) of the security of a computer system (SY) comprising several elementary computer items (BI), each elementary item being supervised in dependence of base measurements (MB) representative of predetermined states of the elementary item, and several gathering items (Ble, Big) respectively gathering elementary items, characterized in that the computer program comprises non-transitory instructions which, when the program is carried out in the supervision device, perform the steps of the method according to claim 1.

* * * * *